(12) United States Patent
Fricke

(10) Patent No.: US 6,237,302 B1
(45) Date of Patent: May 29, 2001

(54) LOW SOUND SPEED DAMPING MATERIALS AND METHODS OF USE

(75) Inventor: J. Robert Fricke, Belmont, MA (US)

(73) Assignee: Edge Innovations & Technology, LLC, Belmont, MA (US)

(*) Notice: Subject to any disclaimer, the term of this patent is extended or adjusted under 35 U.S.C. 154(b) by 0 days.

(21) Appl. No.: 09/063,702

(22) Filed: Apr. 21, 1998

Related U.S. Application Data

(60) Provisional application No. 60/079,333, filed on Mar. 25, 1998.

(51) Int. Cl.[7] ................................................ E04C 3/46
(52) U.S. Cl. ................ 52/720.1; 52/167.6; 52/167.8; 52/729.1; 52/738.1; 52/742.13; 52/745.19
(58) Field of Search ............................. 52/720.1, 167.6, 52/167.8, 729.1, 738.1, 742.13, 745.19

(56) References Cited

U.S. PATENT DOCUMENTS

| | | |
|---|---|---|
| 1,894,276 | 1/1933 | Lampton . |
| 2,862,686 | 12/1958 | Bartlett . |
| 3,586,460 | 6/1971 | Toner . |
| 3,754,746 * | 8/1973 | Thiele .................................. 267/151 |
| 4,019,301 | 4/1977 | Fox . |
| 4,453,887 | 6/1984 | Schucker . |
| 4,566,231 | 1/1986 | Konsevich . |
| 4,623,586 | 11/1986 | Umeya et al. . |
| 4,906,518 | 3/1990 | Inabata . |
| 5,016,602 | 5/1991 | Mizek . |
| 5,020,644 | 6/1991 | Novoa . |
| 5,195,930 | 3/1993 | Hirano et al. . |
| 5,197,707 | 3/1993 | Kohan . |
| 5,327,733 | 7/1994 | Boolchand et al. . |
| 5,345,177 | 9/1994 | Sato et al. . |
| 5,400,296 | 3/1995 | Cushman et al. . |
| 5,472,761 | 12/1995 | Goldberg et al. . |
| 5,504,281 | 4/1996 | Whitney et al. . |
| 5,658,656 | 8/1997 | Whitney et al. . |
| 5,775,049 * | 7/1998 | Fricke .................................. 52/720.1 |
| 5,820,348 * | 10/1998 | Fricke .................................. 416/248 |
| 5,924,261 * | 7/1999 | Fricke .................................. 52/720.1 |

FOREIGN PATENT DOCUMENTS 56-24201   2/1981   (JP) .

OTHER PUBLICATIONS

"Damping Hollow Tubular Structures with 'Lightweight' Viscoelastic Spheres," House, *Proceedings of the ACS Division of Polymeric Materials: Science and Engineering* 60, Dallas, Texas (Spring 1989).

"The Effective Elastic Moduli of a Randon Packing of Spheres," Walton, *J. Mech. Phys. Solids* 35(2), 213–226 (1987).

"Truss Research, M.I.T. Department of Ocean Engineering," *Review Meeting CDNSWC*, Cambridge, MA (Mar. 16, 1994).

"M.I.T. Bead Damping Experiments" (Jun. 15, 1994).

"ARPA/ONR Damping of Lightweight Structures" (Jun. 15, 1994).

"Experimental Effort: Structural Acoustics & Hydroacoustics Research Branch," Warwick (Jun. 15, 1994).

"An Evaluation of Polyethylene Beads as a Damping Treatment for Tubular Truss Structures," Warwick et al., *Carderock Division Naval Surface Warfare Center*, Bethesda, Maryland (Oct. 1994).

* cited by examiner

*Primary Examiner*—Christopher T. Kent
(74) *Attorney, Agent, or Firm*—Choate, Hall & Stewart

(57) ABSTRACT

A composition for reducing vibrations, including both damping structureborne vibrations and reducing radiated airborne noise. The composition is either a mixture of at least two different granular materials, or is a granular material having a bulk sound speed of less than 90 m/s. The damping properties of a mixture can be calculated from the bulk densities and stiffnesses of its individual components.

32 Claims, 7 Drawing Sheets

LOW SOUND SPEED DAMPING MATERIALS AND METHODS OF USE

This application claims benefit and priority of U.S. Provisional Application No. 60/079,333, filed Mar. 25, 1998.

FIELD OF THE INVENTION

The invention relates to the use of granular materials of low bulk sound speeds for acoustic damping.

BACKGROUND OF THE INVENTION

Vibration in built-up structures causes problems ranging from radiation of acoustic noise to damage to sensitive instrumentation. Built-up structures are any composite of beams, plates, joints and other structural components connected to form a nominal single unit. Examples of built-up structures are bridges, electronics cabinets, sports equipment, and automobiles. All of these structures suffer from vibrations to one degree or another. Structural vibration is caused most commonly by external forcing from impact, attached equipment, or fluid flow. In many structural applications it is desirable to reduce the level of such vibrations.

The use of granular material to effect structural damping is well known. Sand and lead shot have been used for some time to provide such damping. For example, sand is used to fill the hollow spaces of tubular beams. Sand and lead shot, though effective in providing damping primarily through a mass loading effect, are very heavy, so that their use extracts a high weight penalty. For example, sand has a bulk specific gravity of not less than 1.5 and lead shot has a bulk specific gravity of approximately 7.

The present inventor has previously established that some lighter weight materials can provide significant vibration damping. U.S. patent application Ser. No. 08/662,167 (allowed) discloses and claims the use of granular materials with a bulk specific gravity of less than 1.5, such as glass micro-spheres or polyethylene beads, for vibration damping. The teachings of this allowed application are incorporated herein by reference. The materials described therein do not rely upon the mass-loading effect of high-density materials, nor on the high intrinsic attenuation of viscoelastic materials. Rather, the dominant damping mechanisms are disclosed to be the small intrinsic attenuation within the solid pieces of granular material, the friction between pieces of granular material, and the non-linear hysteresis in the pieces of granular material arising from deformation during the wave propagation process. The effectiveness of these materials for vibration damping is attributed to a low bulk wave speed characteristic of granular materials.

Thus the prior art acknowledges several desirable characteristics for a granular vibration damping material. The material may have significant mass relative to the host structure such as sand or lead shot, high intrinsic damping characteristics such as viscoelastic spheres, or a low bulk wave speed which allows several other damping mechanisms to come into play. While studies have tried to increase each of material density and viscoelasticity to enhance damping, to date, little, if any, attention has been paid to the reduction of bulk wave speed of materials to improve their vibration damping characteristics.

SUMMARY OF THE INVENTION

In one aspect, the invention comprises a material for damping vibration in a structure. In this aspect, the material is composed of a mixture of at least two granular materials. In a related aspect, the material is a granular material selected to have a bulk sound speed of less than 90 meters/second. An example of the first aspect is a 50/50 mixture of two materials selected from the group consisting of lead shot, sand, rice, low-density polyethylene beads, high-density polyethylene beads, perlite, vermiculite, glass microspheres, and expanded polystyrene beads. An example of the second aspect is a granular composition of perlite, which has been found to exhibit a bulk sound speed of about 62 meters/second. Particularly when the material is a mixture, it may be desirable for the individual grains of the material to adhere at least partially to one another. Such adherence may also be desirable for homogeneous materials such as perlite, for example to reduce rattling.

In further aspects, the invention comprises a method of damping vibration in a structure, whereby at least one of the materials of the previous paragraph is placed in intimate contact with the structure, in an arrangement whereby particles of the material are in intimate contact with each other.

In other related aspects, the invention comprises a damped structural member. The member is damped by intimate contact with one of the granular materials described above, where the granular material is disposed so that its particles are in intimate contact with each other.

In other aspects, the invention comprises methods for tailoring specific mixtures which have a desired sound speed and/or level of damping. The methods include determining damping levels and sound speeds for mixtures of two materials and for mixtures of three or more materials.

As it is used in this application, "Lodengraf™ materials"[1] are granular materials intended for use for vibration damping. "Lodengraf™ damping" refers to methods of vibration damping comprising placing Lodengraf™ materials in intimate contact with at least a portion of a structure subject to vibration.

[1]"Lodengraf™" is a trademark of Edge Innovations & Technology, LLC, the assignee of this application.

In this application, "homogeneous" granular materials are composed of a mixture of particles, where substantially all particles are composed of the same material. "Inhomogeneous" or "heterogeneous" granular materials are composed of a mixture of particles of at least two materials.

As it is used in this application, the "sound speed" of a granular material refers to the bulk sound speed of the material in granular form. Similarly, "density" refers to bulk density of a granular material, not the density of the solid, nonporous material.

BRIEF DESCRIPTION OF THE DRAWING

The invention is described with reference to the several figures of the drawing, in which.

DETAILED DESCRIPTION OF PREFERRED EMBODIMENTS

Current understanding of Lodengraf™ damping is based upon the physical process of radiation from structureborne vibration into the granular material. Historically sand and lead shot granular materials have been used for damping, but significant weight penalties accrue with their use. Previous teachings by the present inventor in U.S. patent application Ser. No. 08/662,167 have focused on low-density granular materials without regard for their sound speed, other than the fact that all homogeneous granular materials tested to date have had sound speeds near 100 meters/second.

The Importance of Sound Speed

Two analysis approaches have been used to evaluate the effectiveness of Lodengraf™ damping as a function of bulk material sound speed. The first approach is based on the assumption that damping is activated by the radiation of structureborne sound into the Lodengraf™ material. The frequency at which bending waves, which are dispersive, become supersonic with respect to the Lodengraf™ material is called the critical frequency and may be written as $$f_c = \frac{1}{2\pi} \frac{c^2}{\kappa c_l}, \tag{1}$$

where $c$ is the bulk sound speed of the granular Lodengraf™ material, $\kappa$ is the radius of gyration of the structural member and $c_l$ is the longitudinal sound speed of the structural material. For frequencies greater than the critical frequency, radiation into the granular material is efficient and structureborne attenuation is high. To improve the effectiveness of the treatment the sound speed of the material can be reduced, thus reducing the critical frequency, which results in a larger fraction of the structureborne vibration being radiated and damped by the Lodengraf™ treatment.

Figure 1:
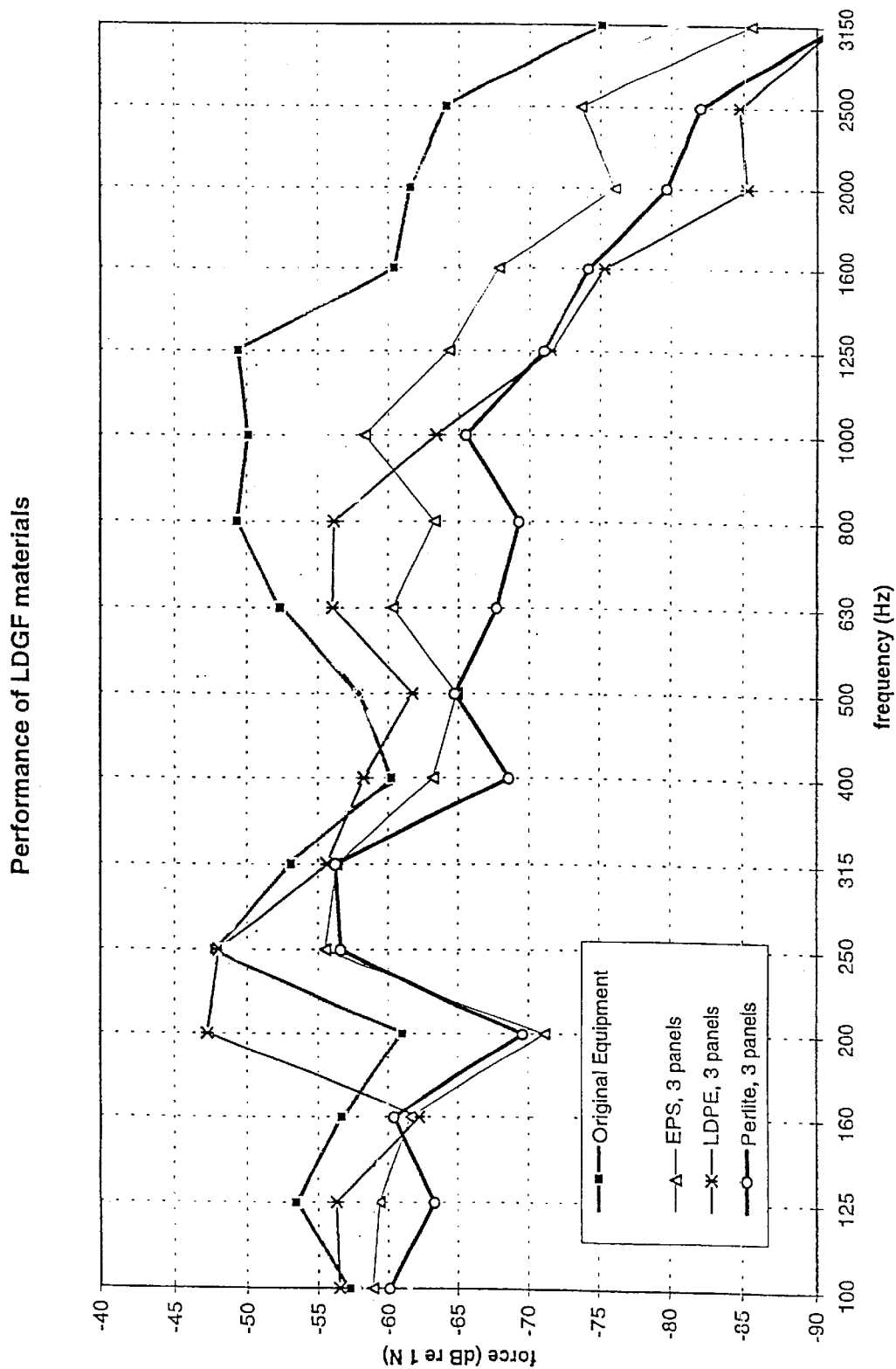
FIG. 1 illustrates the damping characteristics of various Lodengraf™ materials in an electronics enclosure.

An example of this is shown in FIG. 1, which illustrates the results of damping an electronics enclosure using Lodengraf™ technology. The solid squares represent the average ⅓ octave band force level coupled to the base structure supporting the enclosure for the original (unmodified) equipment. The open triangles mark the force levels associated with a damping treatment using expanded polystyrene (EPS, density $\rho = 11$ kg/m$^3$); the x's mark the force levels associated with low-density polyethylene beads (LDPE, density $\rho = 570$ kg/m$^3$); the open circles mark the force levels associated with the perlite (density $\rho = 97$ kg/m$^3$). Clearly density is not the controlling parameter of the Lodengraf™ material in terms of damping effectiveness.

Figure 2:
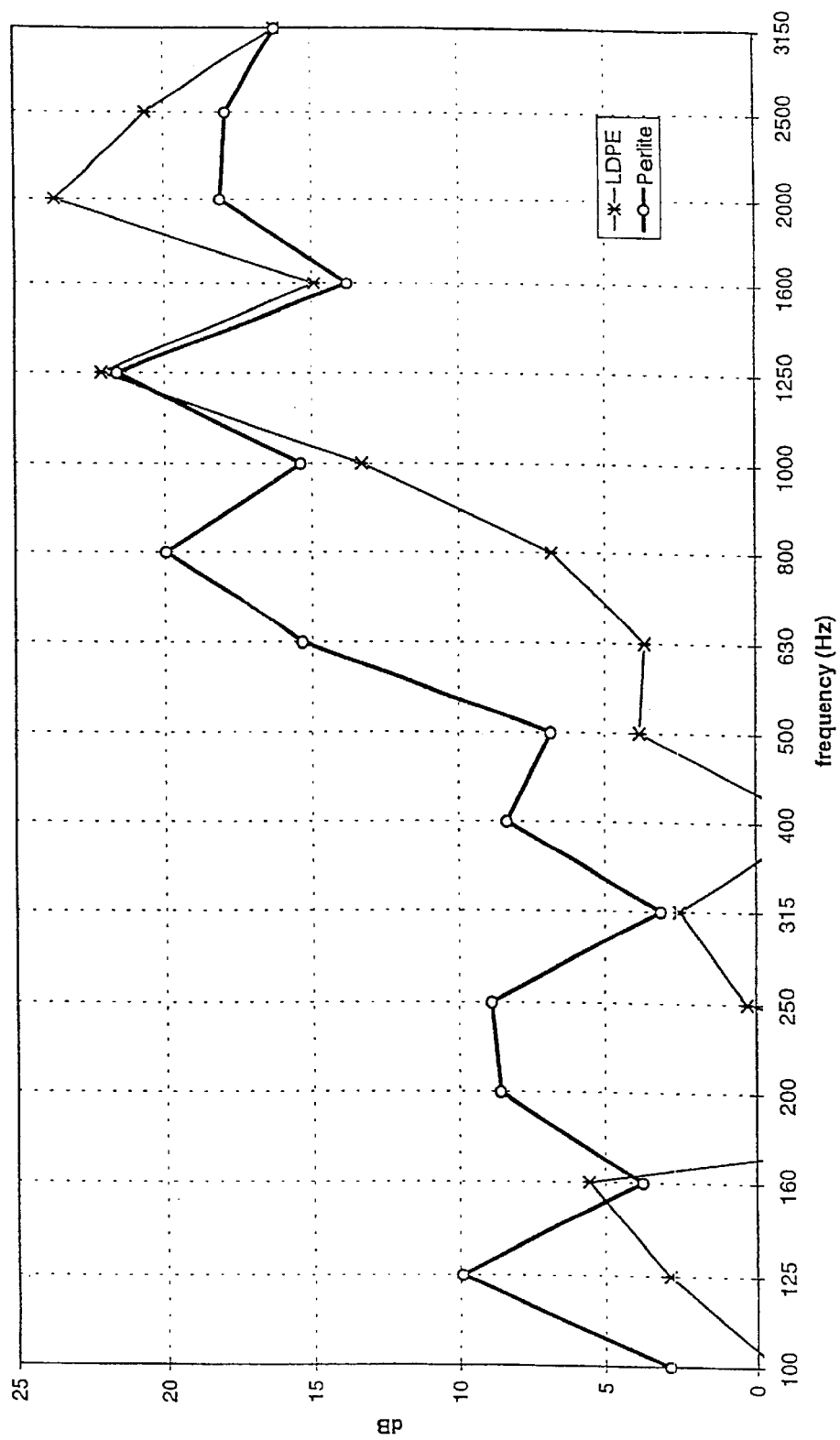
FIG. 2 illustrates the force reduction associated with damping of the electronics enclosure by two Lodengraf™ materials.

Thus, although low-density is useful in some damping applications, it is not the dominant material parameter for damping. By simply specifying "low-density" one has not necessarily chosen the best granular material for specific applications. Now to focus on the importance of sound speed, we compute the difference between the original equipment force levels (solid squares) and the force levels for LDPE and perlite. The results of this calculation are shown in FIG. 2. There are two distinct regions of behavior separated at about 500 Hz. The greater damping levels at higher frequency correspond closely with the onset of radiation for the two Lodengraf™ damping materials. Using Equation (1) and the material properties and geometry of the structural members, the critical frequency for perlite (speed of sound c=62 m/s) is about 260 Hz and the critical frequency for LDPE (speed of sound c=95 m/s) is about 615 Hz. Within an octave of each of these critical frequencies, the damping associated with the respective materials has built up to peak levels (15–20 dB). Thus, the lower sound speed associated with perlite increases the total damping of the structure. An even lower sound speed would produce greater losses.

The second analytical approach used to show the importance of low sound speed is based on Buckingham II dimensional analysis. The procedure was used to analyze the force levels shown in FIG. 1. Total root-mean-square (rms) force was computed by integrating the band level rms force for a variety of materials (e.g., integrating the force levels for LDPE in FIG. 1). The total force level, F, must be related to other system variables such as the volume of Lodengraf™ material V, its density $\rho$, its sound speed c, and the mass of the structure being damped $M_0$. This last variable hides a considerable amount of detail, but for illustration it is useful to keep the analysis simple. By using these five variables in the formalism of the Buckingham II theory, one derives two dimensionless parameters $$\pi_1 = \frac{M_0}{\rho V}, \pi_2 = \frac{F}{\rho c^2 V^{2/3}}. \tag{2}$$

The Buckingham II theory requires that the two $\pi$ parameters be functionally related, i.e., $\pi_2 = f(\pi_1)$. By plotting the experimental data in dimensionless terms, the functional relationship for the electronic enclosure was shown to be linear, and the $\pi$ parameters lead to the simplified function $$F = K \frac{c^2 M_0}{V^{1/3}}, \tag{3}$$

where K is a constant derived from the data. Again, we see the desirability of having a low sound speed in the bulk Lodengraf™ material since total rms force levels decrease as the square of the sound speed decreases. Also, the intuitively satisfying notion that additional Lodengraf™ material improves performance is indicated here with volume in the denominator. Note, however, that the relationship is a rather mild ⅓ power. Finally, the presence of the structure mass in the numerator results from the implicit assumption that the driving acceleration is a constant, which is approximately true for the experimental data used in this analysis. In a more complete analysis input mechanical power would be one of the variables, and this would result in a more complicated relationship with respect to the mass of the device. Nevertheless, the functional relationship with respect to sound speed of the Lodengraf™ material will not be significantly changed. Finally note that density of the Lodengraf™ material does not appear as a variable in Equation (3), which corroborates the earlier analysis. The insignificance of density with respect to acoustic performance provides the engineer considerable latitude in terms of material selection.

Figure 3:
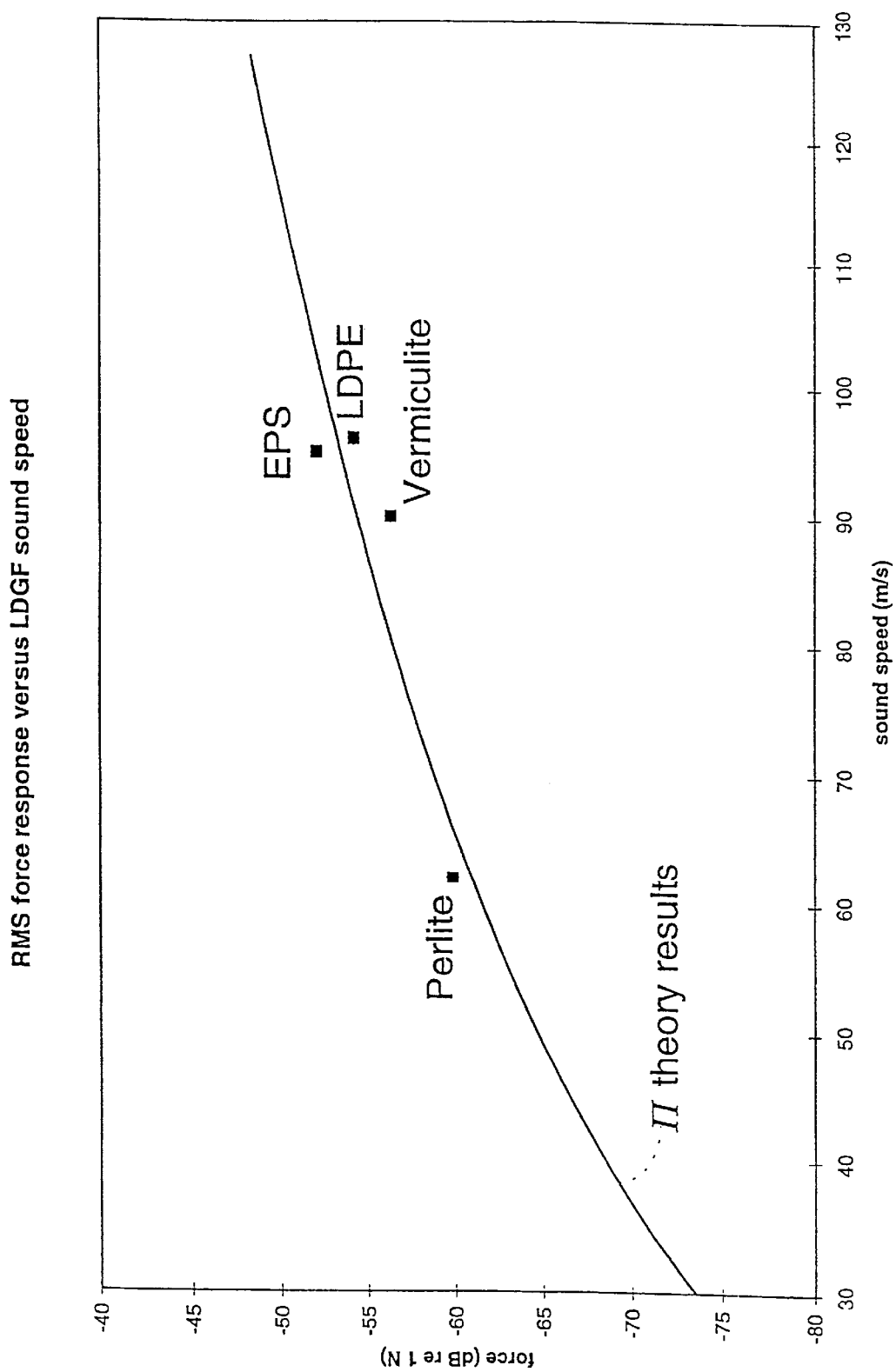
FIG. 3 plots force response vs. sound speed as calculated by Buckingham II theory and compares the result to actual values for several Lodengraf™ materials.

A plot of experimental data and the II theory results is shown in FIG. 3. This result shows the clear relationship of the total rms force with respect to the square of the sound speed. It also shows the almost irrelevancy of the force level to Lodengraf™ density. Note that EPS and LDPE have roughly the same force levels, but their density differs by a factor of over 50:1.

Figure 4:
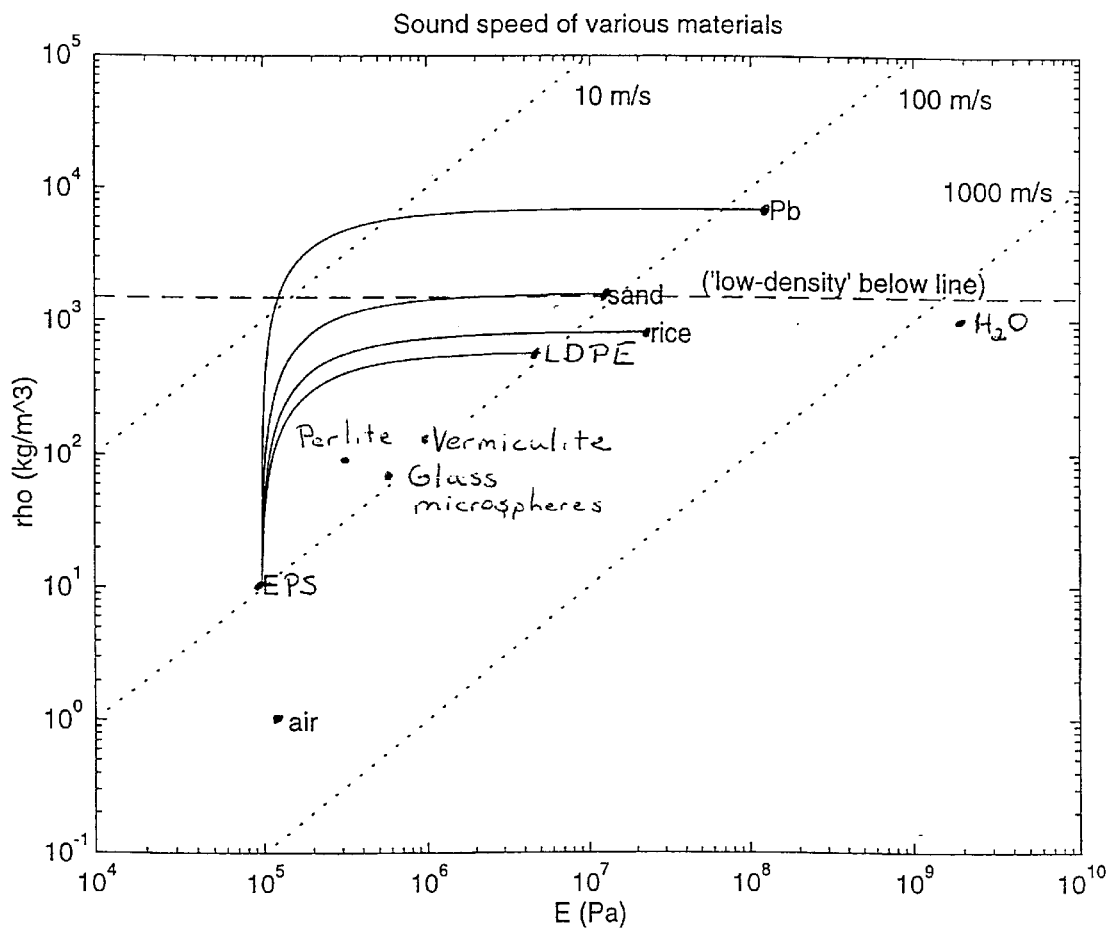
FIG. 4 shows the bulk modulus, density, and sound speed for a number of granular materials.

To further investigate the characteristics of Lodengraf™ material sound speed, consider FIG. 4, which illustrates a two-dimensional space represented by the coordinate axes with bulk Young's modulus on the horizontal axis and bulk material density on the vertical axis. The horizontal line at 1500 kg/m³ separates high and low density materials. Material sound speed in a granular bar may be computed as $$c = \sqrt{\frac{E}{\rho}}, \qquad (4)$$

and contours of constant sound speed are indicated in FIG. 4. Several homogeneous Lodengraf™ materials are identified in FIG. 4, all of which have sound speeds near 100 m/s (although their densities range over three orders of magnitude). Equation (4) indicates that in order to reduce material sound speed to improve damping performance, it is desirable to reduce the modulus of the bulk material for a given density, or to increase the density for a given modulus. Either action tends to push into the upper left region of the E-ρ space indicated in FIG. 4.

The Sound Speed of Mixtures

While monospecies of low sound speed materials may be difficult to manufacture, mixtures of two or more materials can be formed to produce the desired effect. Consider two materials with densities $\rho_1$ and $\rho_2$ and Young's moduli $E_1$ and $E_2$. The bulk density of a mixture of the two can be written as $$\rho = (1-\alpha)\rho_1 + \alpha\rho_2, \qquad (5)$$

where α is the fraction of material "2." Similarly, the bulk Young's modulus may be written as $$E = \frac{1}{\frac{(1-\alpha)}{E_1} + \frac{\alpha}{E_2}} = \frac{E_1 E_2}{(1-\alpha)E_2 + \alpha E_1}. \qquad (6)$$

Substituting Equations (5) and (6) into Equation (4) yields an expression for the bulk material sound speed for mixtures as a function of the mixture fraction, $$c = \sqrt{\frac{E_1 E_2}{[(1-\alpha)E_2 + \alpha E_1][(1-\alpha)\rho_1 + \alpha\rho_2]}}. \qquad (7)$$

Figure 5:
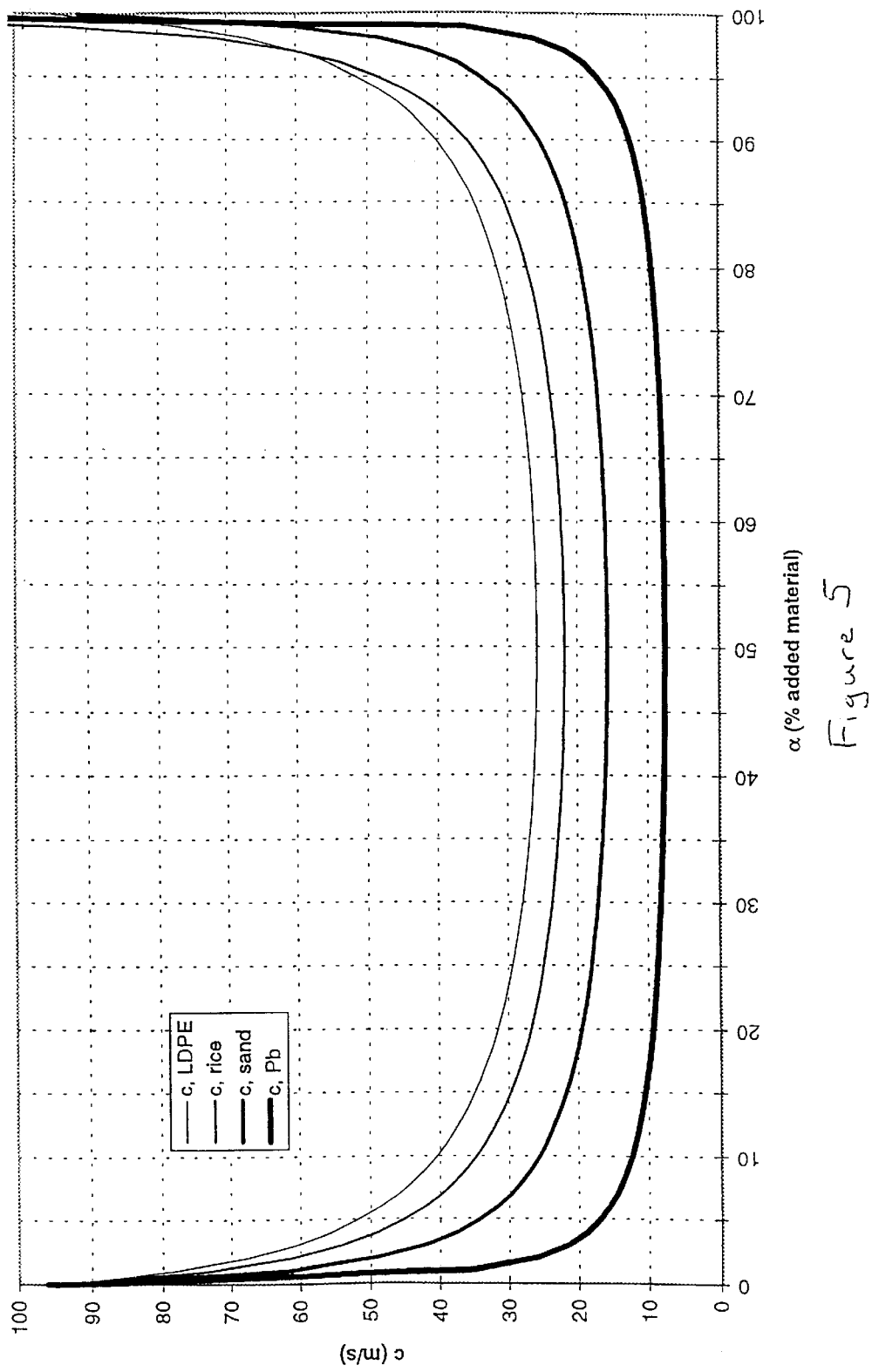
FIG. 5 illustrates the calculated sound speeds of mixtures of EPS with other granular materials.

FIG. 5 illustrates the result of mixing EPS (ρ=11 kg/m³, E=0.098 MPa) with a variety of materials. The results show that even with relatively high homogeneous sound speeds, it is possible to create Lodengraf™ mixtures with extremely low sound speeds, e.g., a few tens of meters per second or less. Using Equation (7), a 50/50 mixture of EPS and lead shot (ρ=6910 kg/m³, E=130 MPa) is calculated to have a density of 3460 kg/m³, a Young's modulus of 0.20 MPa, and a speed of sound of 7.5 m/s. While this is not a low-density mixture, its extremely low sound speed may make the weight penalty for its use tolerable for situations where extreme levels of vibration damping are required. The solid curves shown on FIG. 4 represent the mixtures shown in FIG. 5. In the solid curves of FIG. 4, α increases up and to the right along each curve.

Figure 6:
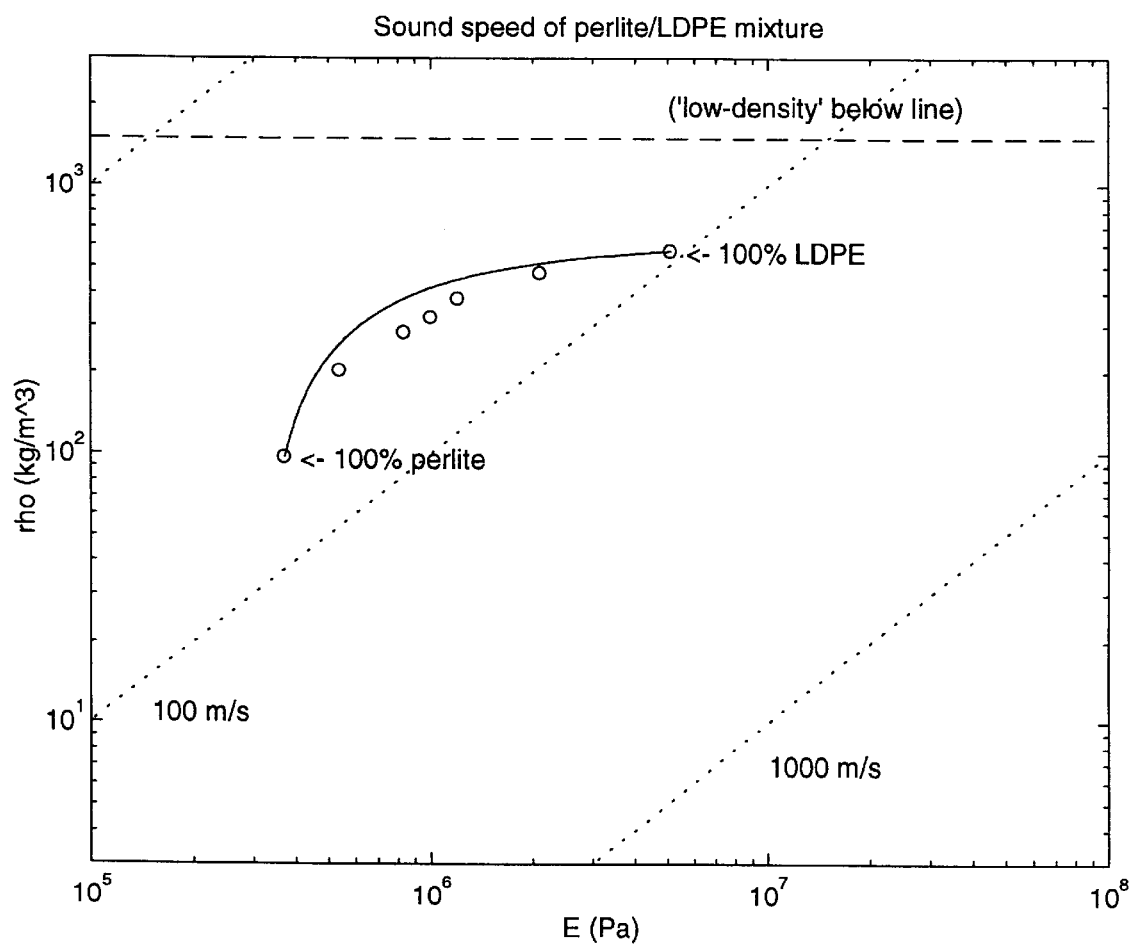
FIG. 6 plots the measured sound speed for various mixtures of perlite and LDPE and compares these to theoretically calculated values.

These theoretical calculations of sound speed of mixtures have been verified in practice. FIG. 6 plots the measured sound speed of mixtures of perlite and LDPE beads, and compares these to values computed according to Equation (7). The solid curve linking data points for pure LDPE and pure perlite represents the predictions of Equation (7), and open circles represent measured values for various mixtures of perlite and LDPE. These experimental data confirm the analytic predictions that reduced sound speed can be realized by the proper choice of granular species and mixture ratios. Other experimental measurements on a mixture of 40 volume percent perlite and 60 volume percent sand resulted in a measured sound speed of 37 m/s, as compared to a value of 30 m/s calculated by Equation (7).

It should be noted that this mixing process is not limited to two species of materials. Extensions to three or more materials can be developed by simply substituting the effective material properties of a mixture as one of the two materials used in Equations (5) and (6). In this way, the sound speed of a mixture of any number of materials can be computed. For an arbitrary number of material species, the composite sound speed is found to be $$c = \sqrt{\frac{1}{\sum_i \sum_j \frac{\alpha_i \alpha_j}{c_{ij}^2}}}, \qquad (8)$$

where $\alpha_i$ (or $\alpha_j$) is the volume fraction of the $i^{th}$ (or $j^{th}$) material species, $\Sigma\alpha_i = 1$, and $c_{ij}^2 = E_i/\rho_j$, which is the square of the sound speed of a hypothetical material with the modulus of the $i^{th}$ material species and the density of the $j^{th}$ material species. For a given set of material species having moduli $E_i$ and densities $\rho_i$, a mixture with the least possible sound speed can be computed by minimizing Equation (8) with respect to the volume fractions $\alpha_i$. If it is desirable to constrain the mixture composite density or modulus then a constrained minimization of Equation (8) may be performed. Equation (8) reduces to Equation (7) when only two material species are used.

Effective Damping Materials of the Invention

Understanding of the role of bulk sound speed in vibration damping by granular materials allows determination of useful materials which the prior art does not teach to be effective for vibration damping applications. For example, perlite, an expanded volcanic siliceous glass with a bulk speed of sound of 62 m/s, has been found to provide excellent damping performance, despite its light weight and lack of viscoelasticity. Vermiculite (c=90 m/s) also contradicts the beliefs of the prior art by exhibiting excellent damping behavior, despite having a low density and negligible viscoelasticity.

Once the importance of bulk sound speed and the possibility that it may be reduced by employing heterogeneous materials has been appreciated, it will be apparent to those skilled in the art that Equation (7) can be combined with known functional relationships for particular applications, such as Equation (3) for the electronics enclosure described above, to allow calculation of optimum mixtures. In particular, if we consider the improvement in force level F obtained by adding a quantity α of material 2 to a homogeneous material 1 by substituting Equation (7) into Equation (3), we obtain the expression $$F' = F_1 \frac{1}{\left[(1-\alpha) + \alpha\frac{E_1}{E_2}\right]\left[(1-\alpha) + \alpha\frac{\rho_2}{\rho_1}\right]}, \qquad (9)$$

where $F_1$ represents the damping force level of the pure material 1, and F' represents the damping force level of the mixture. It will be apparent that this expression can be differentiated with respect to α to determine an optimum value of the volume fraction for a particular materials system.

Equation (9) conceals a subtlety, however. The expression $F_1$ contains a volume term, and the expression for F' thus represents the force level for a system of the same volume. However, in many applications, the critical system parameter will be, not the volume of damping material, but the mass. By substituting m/ρ for V in Equation (3) and substituting in Equation (7), we obtain the improvement factor for a constant mass system:

$$F' = F_1 \frac{1}{\left[(1-\alpha)+\alpha\frac{E_1}{E_2}\right]\left[(1-\alpha)+\alpha\frac{\rho_2}{\rho_1}\right]^{\frac{2}{3}}}. \tag{10}$$

It will be apparent to one skilled in the art that the difference between Equation (9) (constant volume) and Equation (10) (constant mass) will lead to a different choice of optimum value for α for a particular materials system, whereby the optimum value for α calculated by Equation (10) will be smaller than the value calculated by Equation (9) when material 2 is denser and stiffer than material 1. In particular, the optimum value of α is found to be $$\alpha_{opt} = -\frac{1}{n+1}\left[\frac{\left(\frac{E_1}{E_2}-1\right)+n\left(\frac{\rho_2}{\rho_1}-1\right)}{\left(\frac{E_1}{E_2}-1\right)\left(\frac{\rho_2}{\rho_1}-1\right)}\right], \tag{11}$$

where n is the exponent of the ρ term in the denominator of equations (9) and (10); i.e., n=1 for volume-limited damping applications, and n=⅔ for mass-limited damping applications.

Figure 7:
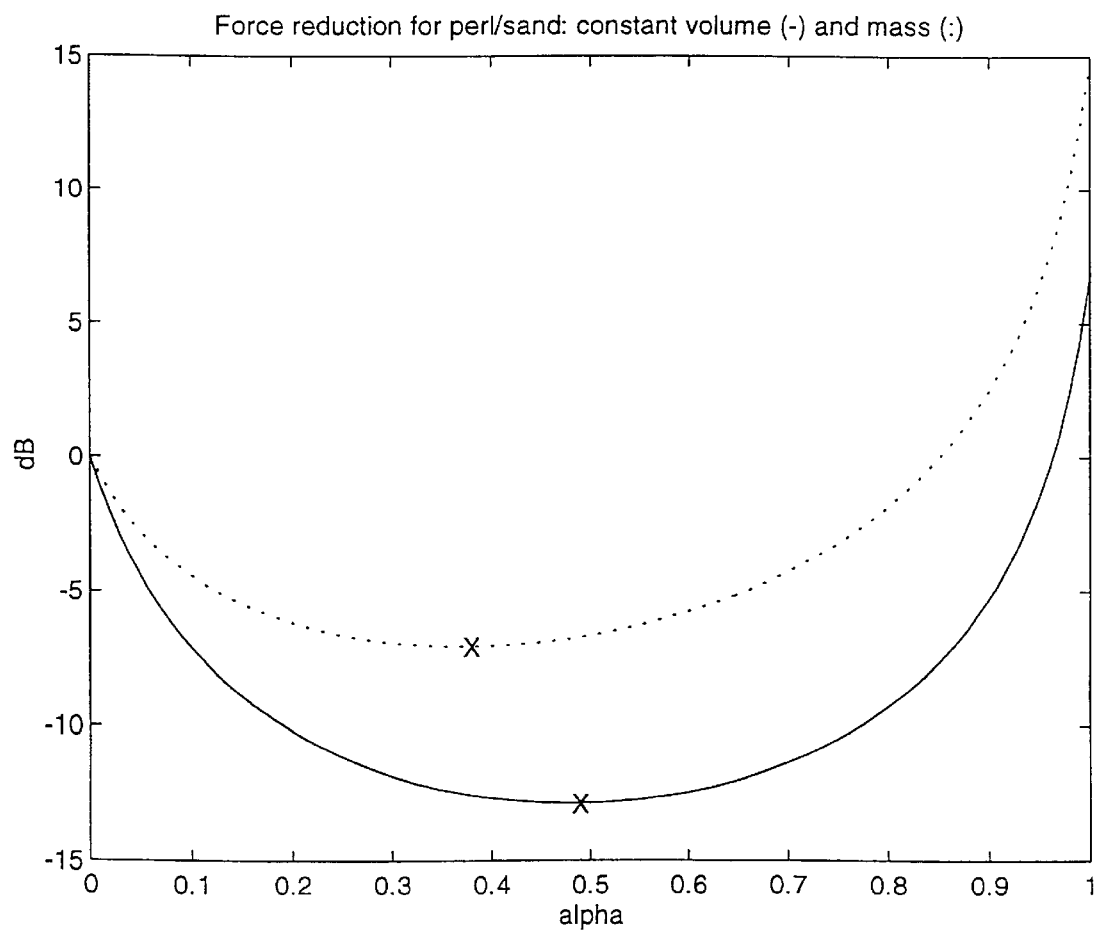
FIG. 7 shows the calculated damping force reduction resulting from the addition of sand to perlite on a constant volume and a constant mass basis.

The difference between mass-limited and volume-limited damping is illustrated in FIG. 7, in which the solid line represents the force reduction when perlite is replaced by an equal volume of sand, and the dashed line represents the force reduction when perlite is replaced by an equal mass of sand. The minimum value of the sound speed is marked by an x on both curves; this value is approximately 0.5 for the constant volume curve, and approximately 0.4 for the constant mass curve.

As noted above, the transmitted force as specified by Equation (3) (and incorporated into Equations (9)–(11)) is specialized for a certain class of structures. In a more general context, one may take the transmitted force to be of the form $$F = Kc^{\beta}V^{-\gamma}, \tag{12}$$

where K is a constant, and β and γ are arbitrary powers of the bulk granular material sound speed, c, and volume, V, respectively. Using logic similar to that leading to Equations (9) and (10), the reduced force may be computed to be $$F' = F_1 \frac{1}{\left[(1-\alpha)+\alpha\frac{E_1}{E_2}\right]^{\beta/2}\left[(1-\alpha)+\alpha\frac{\rho_2}{\rho_1}\right]^{\beta/2-q}}, \tag{13}$$

where q=0 for the volume-limited case and q=γ for the mass-limited case. Furthermore, differentiation with respect to a leads to the optimum value for the volume fraction of $$\alpha_{opt} = -\frac{1}{\beta-q}\left[\frac{\left(\frac{E_1}{E_2}-1\right)\frac{\beta}{2}+\left(\frac{\rho_2}{\rho_1}-1\right)\left(\frac{\beta}{2}-q\right)}{\left(\frac{E_1}{E_2}-1\right)\left(\frac{\rho_2}{\rho_1}-1\right)}\right], \tag{14}$$

where, again, q=0 for the volume-limited case and q=γ for the mass-limited case.

Note that Equations (9) and (10) are special cases of Equation (13), and Equation (11) is a special case of Equation (14), for a system where β=2 and γ=⅓.

Practically, it may be found difficult to mix two different granular materials in a way that avoids separation of the materials during use. One method for preventing the materials from migrating is to coat the materials or otherwise render their surfaces somewhat tacky. If the individual grains of the material lightly adhere to their neighbors, they will tend not to migrate during use, and the material will retain its damping efficiency. It has been found that wetting some Lodengraf™ materials in water and then heat-drying them in the configuration in which they will be used causes the grains to adhere lightly to one another. A similar effect could also be produced by coating the individual grains with a thin layer of shellac or a similar substance. This type of adhesion may also be desirable in homogeneous granular materials in certain applications, for example, to prevent rattling.

Other embodiments of the invention will be apparent to those skilled in the art from a consideration of the specification or practice of the invention disclosed herein. It is intended that the specification and examples be considered as exemplary only, with the true scope and spirit of the invention being indicated by the following claims.

What is claimed is:

1. A composition for damping vibration in a structure, where the composition is a mixture of at least two granular materials and wherein the composition has a bulk sound speed of less than 90 meters/second.

2. The composition of claim 1, where the granular materials are selected from the group consisting of lead shot, sand, rice, low-density polyethylene beads, high-density polyethylene beads, perlite, vermiculite, glass microspheres, and expanded polystyrene beads.

3. The composition of claim 1, where the granular materials comprise individual grains whose surfaces at least partially adhere to adjacent grains.

4. A granular material for damping vibration in a structure, wherein the granular material comprises individual grains whose surfaces at least partially adhere to adjacent grains.

5. The granular material of claim 4, wherein the material comprises at least one of vermiculite and perlite.

6. The granular material of claim 4, wherein the material is selected to have a bulk sound speed of less than 90 meters/second.

7. The granular material of claim 4, wherein the material comprises a mixture of at least two granular materials.

8. A method for damping vibration in a structure comprising:
    placing a granular composition into intimate contact with the structure wherein particles of the granular composition are in intimate contact with each other, the granular composition comprising a mixture of at least two granular materials and having a bulk sound speed of less than 90 meters/second.

9. The method of claim 8, where the granular materials are selected from the group of lead shot, sand, rice, low-density polyethylene beads, high-density polyethylene beads, perlite, vermiculite, glass microspheres, and expanded polystyrene beads.

10. The method of claim 8, where the granular materials comprise individual grains whose surfaces at least partially adhere to adjacent grains.

11. The method of claim 8, where the vibration is structureborne vibration.

12. The method of claim 8, where damping the vibration reduces airborne noise.

13. A method for damping vibration in a structure comprising:

placing granular material into intimate contact with the structure wherein particles of the granular material are in intimate contact with each other, the granular material comprising individual grains whose surfaces at least partially adhere to adjacent grains.

14. The method of claim 13, wherein the granular material comprises at least one of vermiculite and perlite.

15. The method of claim 13, wherein the granular material comprises a mixture of at least two granular materials.

16. The method of claim 13, wherein the granular material is selected to have a bulk sound speed of less than 90 meters/second.

17. The method of claim 13, wherein the vibration is structureborne vibration.

18. The method of claim 13, wherein damping the vibration reduces airborne noise.

19. A damped structural member comprising:

a structural member; and a mixture of at least two granular materials in intimate contact with the material wherein particles of the mixture are in intimate contact with each other and wherein the mixture has a bulk sound speed of less than 90 meters/second.

20. The member of claim 19, where the granular materials are selected from the group of lead shot, sand, rice, low-density polyethylene beads, high-density polyethylene beads, perlite, vermiculite, glass microspheres, and expanded polystyrene beads.

21. The member of claim 19, where the granular materials comprise individual grains whose surfaces at least partially adhere to adjacent grains.

22. A damped structural member comprising:

a structural member; and granular material in intimate contact with the member, wherein the granular material comprises particles that are in intimate contact with each other and that have surfaces that at least partially adhere to adjacent particles.

23. The member of claim 22, wherein the granular material comprises at least one of vermiculite and perlite.

24. The member of claim 22, wherein the material comprises a mixture of at least two granular materials.

25. The member of claim 22, wherein the material has a bulk sound speed of less than 90 meters/second.

26. A method for tailoring the properties of a mixture of a first granular material and a second granular material to be used for vibration damping of a structural member, comprising:

determining densities and moduli of the granular material;

determining a desired bulk sound speed of the mixture;

determining volume fractions of the materials which will achieve the desired sound speed according to $$c = \sqrt{\frac{E_1 E_2}{[(1-\alpha)E_2 + \alpha E_1][(1-\alpha)\rho_1 + \alpha \rho_2]}},$$

where $E_1$ and $E_2$ represent the moduli of the first and second materials respectively, $\rho_1$ and $\rho_2$ represent the densities of the first and second materials respectively, c represents the bulk sound speed of the mixture, and $\alpha$ represents the volume fraction of the second material;

mixing the materials in the determined volume fraction; and placing the mixed materials in intimate contact with the structural member.

27. The method of claim 26, wherein at least one of the first and second materials comprises a mixture of at least two granular materials.

28. The method of claim 26, further comprising mixing the first and second materials in a volume fraction determined to yield the desired sound speed.

29. A method for tailoring the properties of a mixture of a first granular material and a second granular material to be used for vibration damping of a structural member, comprising:

determining densities and moduli of the granular materials;

determining a desired level of damping;

determining a relationship between damping force level, damping material sound speed, and damping material volume of the form $$F = K c^\beta V^{-\gamma},$$

where F represents damping force level, c represents damping material sound speed, V represents damping material volume, and K, $\beta$, and $\gamma$ are arbitrary constants;

determining volume fractions of the materials which will achieve the desired level of damping according to $$F' = F_1 \frac{1}{\left[(1-\alpha) + \alpha \frac{E_1}{E_2}\right]^{\frac{\beta}{2}} \left[(1-\alpha) + \alpha \frac{\rho_2}{\rho_1}\right]^{\frac{\beta}{2}-q}}$$

where $E_1$ and $E_2$ represent the moduli of the first and second materials respectively, $\rho_1$ and $\rho_2$ represent the densities of the first and second materials respectively, $F_1$ represents a damping force level of pure first material, F' represents a damping force level of the mixture, $\alpha$ represents the volume fraction of the second material, q is equal to zero for volume-limited damping, and q is equal to $\gamma$ for mass-limited damping;

mixing the materials in the determined volume fraction; and placing the mixed materials in intimate contact with the structural member.

30. The method of claim 29, wherein at least one of the first and second materials comprises a mixture of at least two granular materials.

31. The method of claim 29, wherein $\beta=2$ and $\gamma=\frac{1}{3}$.

32. The method of claim 29, further comprising mixing the first and second materials in a volume fraction determined to yield the desired damping level.

* * * * *